(12) United States Patent
Joyce

(10) Patent No.: US 10,492,643 B2
(45) Date of Patent: Dec. 3, 2019

(54) THERMALLY EFFICIENT COOKING GRATE

(71) Applicant: Patrick Joyce, Arlington Heights, IL (US)

(72) Inventor: Patrick Joyce, Arlington Heights, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 126 days.

(21) Appl. No.: 15/599,996

(22) Filed: May 19, 2017

(65) Prior Publication Data

US 2018/0333002 A1 Nov. 22, 2018

(51) Int. Cl.
*A47J 37/06* (2006.01)
*A47J 37/07* (2006.01)

(52) U.S. Cl.
CPC ....... *A47J 37/0704* (2013.01); *A47J 37/0682* (2013.01); *A47J 37/0694* (2013.01); *A47J 37/0786* (2013.01); *A47J 37/067* (2013.01)

(58) Field of Classification Search
CPC ............... A47J 37/0704; A47J 37/0678; A47J 37/0694; A47J 37/067
USPC .................. 99/450, 400, 446, 445, 401, 447
See application file for complete search history.

(56) References Cited

U.S. PATENT DOCUMENTS

| | | | | |
|---|---|---|---|---|
| 2,253,834 A * | 8/1941 | Volks | ................ | A47J 37/0682 126/214 R |
| 2,742,850 A * | 4/1956 | La Fond | ................ | A47J 37/10 126/215 |
| 3,555,994 A * | 1/1971 | Nemetz | ................ | A47J 37/0786 126/25 R |
| 3,717,083 A * | 2/1973 | Karapetian | ........... | A47J 36/022 126/25 R |
| 4,403,541 A | 9/1983 | Berger | | |
| 5,105,725 A * | 4/1992 | Haglund | ............. | A47J 37/0704 126/25 R |
| 5,490,452 A | 2/1996 | Schlosser | | |
| 6,389,961 B1 * | 5/2002 | Wu | ...................... | A47J 37/0682 99/339 |
| 6,481,343 B1 | 11/2002 | Rigney | | |
| 7,373,875 B2 | 5/2008 | Bruno | | |
| 7,640,929 B2 | 1/2010 | Johnson | | |
| 7,810,484 B2 | 10/2010 | Schlosser | | |
| 2004/0112362 A1 | 6/2004 | Bruno | | |

(Continued)

FOREIGN PATENT DOCUMENTS

JP S4741246 12/1972
WO 2010053475 A1 5/2010

(Continued)

OTHER PUBLICATIONS www.grillparts.com, Weber grill parts: two piece stainless steel "channel formed" cooking grate set.

(Continued)

*Primary Examiner* — Reginald Alexander
(74) *Attorney, Agent, or Firm* — Vitale, Vickrey, Niro, Solon & Gasey LLP

(57) ABSTRACT

A cooking grate for a grill is provided having substantially hollow rungs in fluid communication with each other and/or with a substantially hollow border to provide improved thermal management and more efficient heat transfer.

18 Claims, 9 Drawing Sheets

(56) References Cited

U.S. PATENT DOCUMENTS

2005/0166767 A1* 8/2005 Johnson .............. A47J 37/0704
  99/450
2016/0015211 A1 1/2016 Ahmed
2016/0360924 A1* 12/2016 Bruin-Slot .......... A47J 37/0694

FOREIGN PATENT DOCUMENTS

WO 2012083063 A1 6/2012
WO 2013173362 A1 11/2013

OTHER PUBLICATIONS www.grillparts.com, Weber grill parts: two piece porcelain coated cooking grate set.
Examination Report No. 1 dated Sep. 13, 2018 in corresponding Australian Application No. 2018203349.
Extended European Search Report dated Jul. 20, 2018 in corresponding European Application No. 18172840.3.
Office Action dated Jul. 23, 2019 in corresponding Japanese Application No. 2018-094322.

* cited by examiner

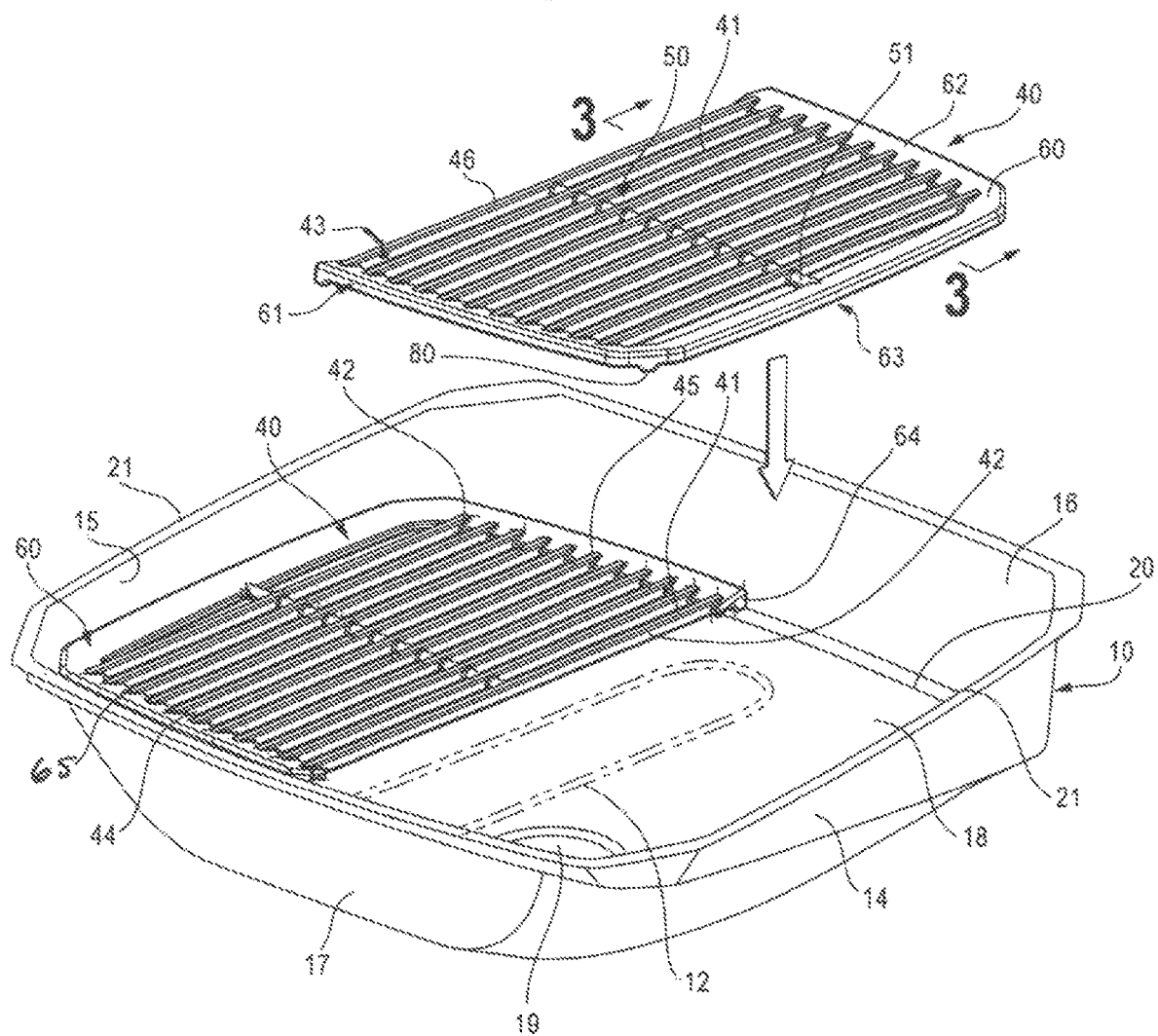

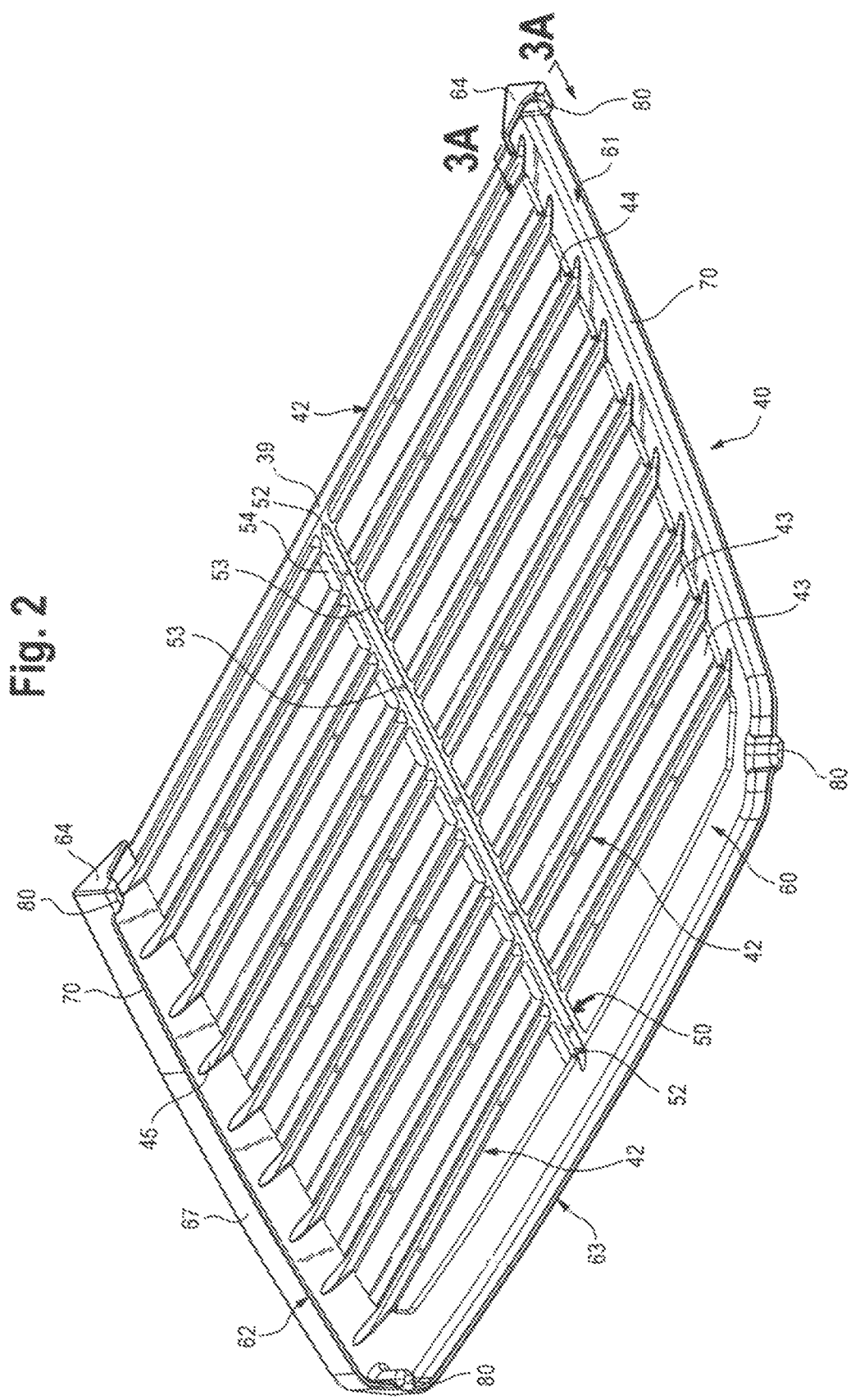

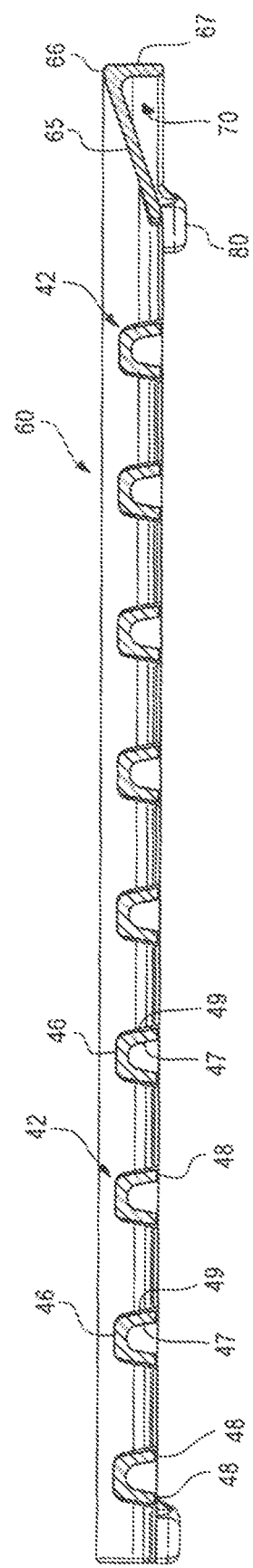

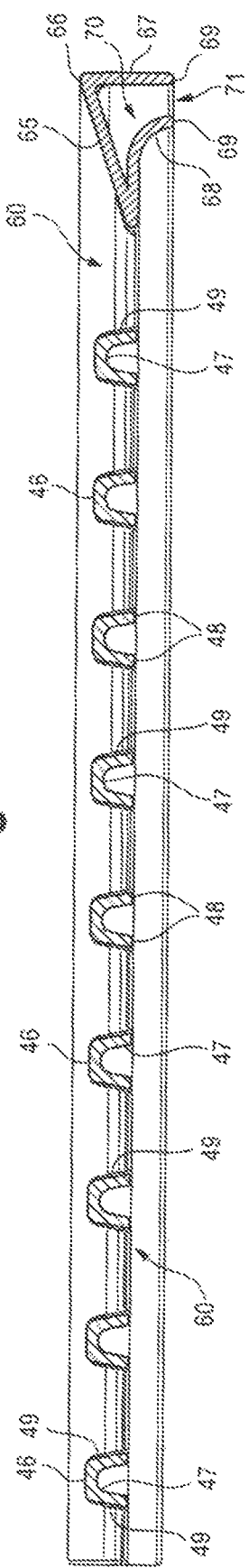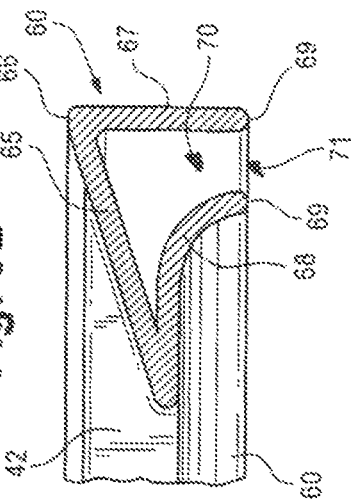

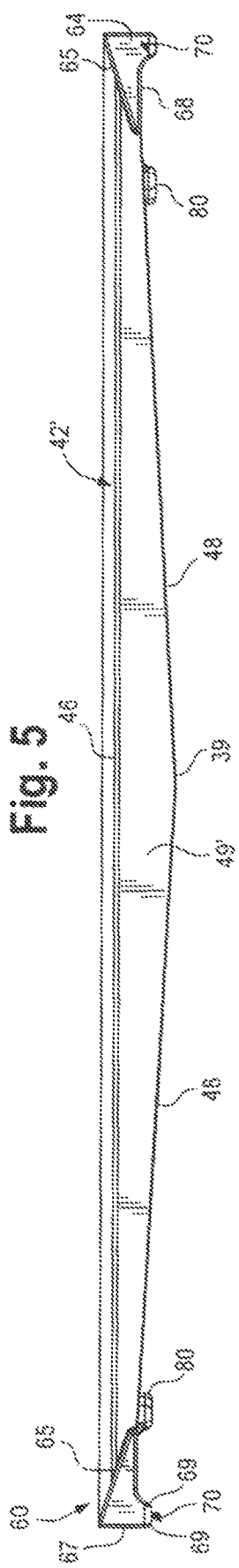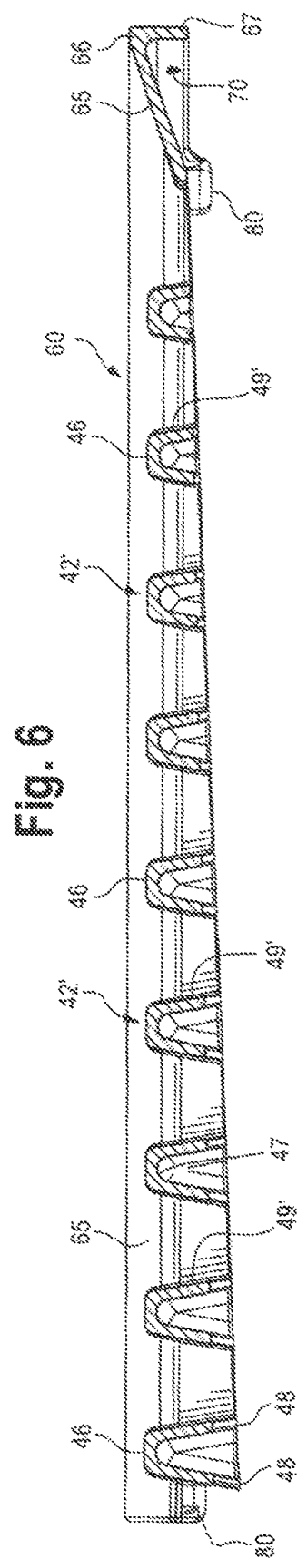

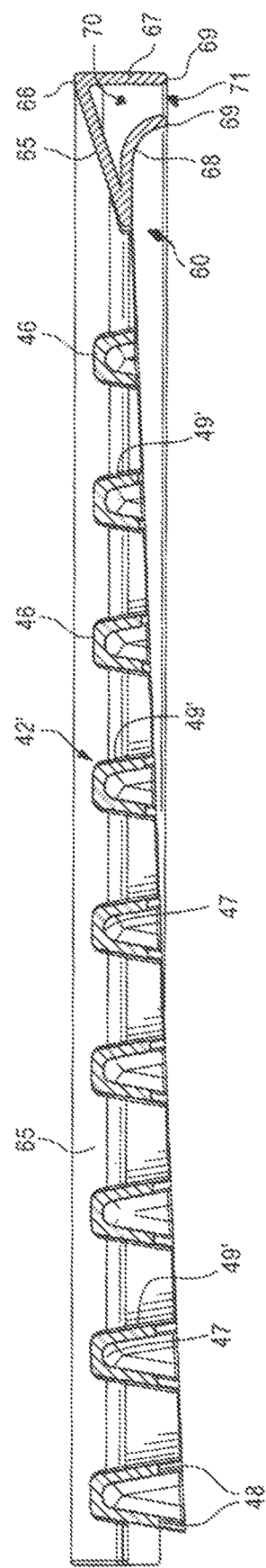

THERMALLY EFFICIENT COOKING GRATE

FIELD OF THE INVENTION

The present inventions relate to grilling assemblies having cooking grates. More particularly, the present inventions relate to thermally efficient cooking grates having substantially hollow rungs connected to and in fluid communication with each other and/or a border having a substantially hollow, downwardly facing channel or chamber.

BACKGROUND OF THE INVENTION

There are a variety of known cooking grates used with charcoal, gas and electric grills and grill type appliances. Typical grill assemblies include a lower firebox that houses the particular heat source. The firebox includes an upper ledge that serves to support a cooking grate above the heat source. A lid, which may be hinged to the firebox, is also provided to enclose the grate and firebox and forming a cooking chamber. The typical horizontal cross-sectional shape of the firebox is generally circular, square or rectangular, with the cooking grate having a complimentary shape to sit on and be supported by the ledge of the firebox.

Conventional cooking grates typically include a plurality of elongated members or rungs that are usually parallel to one another and separated by gaps or spaces to create a cooking surface. Support or cross members may also be provided which are transverse to or otherwise cross the plurality of elongated members or rungs. A frame that coincides with the shape of the firebox may also be provided to which the rungs and cross-member may be attached. Other conventional cooking grates are plate type members having slots and raised surfaces to support the food to be cooked.

One type of conventional cooking grate is described in U.S. Pat. No. 5,490,452, which is assigned to Weber-Stephen Products LLC. There, the grate includes a number of elongate rods with openings between them. The rods are attached to a circular perimeter ring that coincides with the shape of the firebox. Support or cross members are also provided. The circular ring sits on the ledge of the firebox and supports the rungs to form the cooking surface. Another type of conventional grate is shown in U.S. Pat. No. 6,481,343, which provides for a rectangular plate type grate having raised portions with openings. Other exemplary type grates are shown and described in U.S. Pat. Nos. 7,810,484, 7,640,929 and 7,373,875, all of which are also assigned to Weber-Stephen Products LLC.

Although effective, conventional grates are slow to respond to thermal changes, largely because of the solid nature of the rungs and their inability to thermally communicate with one another. This may result in, among other things, ineffective searing of food. Solid rungs may also result in excess smoke and grease build-up depending upon the type of grill. Therefore, there is a need for cooking grates that provide better thermal management and more efficient heat transfer. The present inventions and the various embodiments thereof achieve one or all of these goals as well as others.

SUMMARY OF THE INVENTION

The present inventions preserve the advantages of known cooking grates and also provide new features, objects and advantages that are summarized herein.

In a preferred embodiment of the present invention, a grill assembly is provided that includes a firebox having a top, a bottom, a front and a back, with the bottom of the firebox having a generally central opening. A heat source located near the bottom of the firebox is also provided. The preferred embodiment provides at least one cooking grate removably supported by the firebox above and adjacent to the heat source, the cooking grate defined by at least a first border portion and a second border portion which may be supported by the firebox, the border portions having a substantially hollow, downwardly facing interior channel. A plurality of substantially hollow, spaced apart rungs are provided, each end of which is joined to and in fluid communication with the substantially hollow interior of the first and second border portions. In a preferred embodiment, each rung of the grill assembly has a length, two ends, a bottom surface and a cross-sectional shape, the bottom surface having a downwardly facing, concave shape forming a substantially hollow channel along at least a substantial portion of the bottom surface of the length of each rung. The cooking grate may further include at least one transverse cross member having a substantially hollow, downwardly facing interior channel which is in fluid communication with said rungs. Also in a preferred embodiment, the border portions include an upper surface connected to an outer leg wherein the upper surface and outer leg form a substantially open, downwardly facing channel. The preferred grill assembly may provide a plurality of grate sections (e.g., a right grate piece and a left grate piece) that together form the cooking surface of the grill. The substantially hollow border portion of each grate piece may further include a third or fourth border portion interconnecting the first and second border portions. In a preferred embodiment, the transverse support member is in fluid communication with the third or fourth border portions. The preferred border portions may include an inner leg and an outer leg. In an alternative preferred embodiment, the bottom surface of the rungs include bottom edges that taper along the length from one, or both ends toward the center of the length of the rung.

The present inventions also provide for a grill assembly having a firebox with a front, a back, two sides and a bottom, the bottom having a generally central opening and an upper portion of the firebox having a ledge, as well as a heat source located with the firebox and below the ledge. A cooking grate removably supported on the ledge of the firebox, the cooking grate including a plurality of spaced apart rungs with spaces therebetween, the rungs having a length, a front end and a rear end, a bottom surface and a cross-sectional shape, the cross-sectional shape of the bottom surface forming a substantially open and downwardly facing, concave channel along at least a portion of the length of the rungs are provided. The front end of the rungs are joined to and in fluid communication with a substantially hollow front border portion and the rear end of the rungs are joined to and in fluid communication with a rear border portion, both border portions capable of resting on the ledge of the firebox. At least one substantially hollow side border portion which is connected to and in fluid communication with the front and rear border portions may also be included. Where the front border portion joins the side border portion and where the rear border portion joins the side border portion may be chamfered to properly sit on and align with the ledge of the firebox. In another preferred embodiment, the length of the rung includes two side surfaces, the side surfaces increasing in depth from each end of the rung to a center of the rung. Each border portion may additionally include a cross-section having a generally triangular configuration and a substantially hollow interior chamber, as well as an upper surface that forms a downwardly sloping surface from an outside edge to a center of the firebox.

A cooking grate for use on a grill, the cooking grate having a first end and a second end is further provided. The cooking grate includes a substantially hollow border having at least a first border portion and a second border portion, a plurality of spaced apart rungs having spaces therebetween, each rung having a first end, a second end, a top surface and a bottoms surface, the bottom surface forming a downwardly facing, concave shape forming a substantially hollow channel along a substantial portion of the rungs from the first end to the second end. Moreover, the first end of each rung is joined to the at least first border portion, and the second end of each rung joined to the second border portion, respectively, such that the substantially hollow channel of the rungs is in fluid communication with the substantially hollow channel of each border portion. A third substantially hollow border portion connected to and in fluid communication with the first and second border portions may also be provided. Each preferred border portion may include an upper surface and outside edge, wherein the upper surface slopes downwardly from the outside edge to an inner portion. In addition, the rungs may include side surfaces, the side surfaces increasing in height from the first end and the second end toward a center of the rungs. In still another embodiment, a first, a second and third border portions are provided forming an edge along three sides of said grate, each of which is attached to and in fluid communication with the adjacent border portion. In this embodiment, two grates may be provided, each having at least three border portions adjacent to the ledge of the firebox to collectively form the cooking surface. In addition, each border portion may include a substantially downwardly facing opening or channel along the bottom.

In addition, at least one cross member having two ends and a bottom surface forming a substantially hollow, downwardly facing channel, at least one end of the cross member joined to and in fluid communication with said third border portion may be provided, wherein the at least one cross member is in fluid communication with said rungs. In yet another embodiment, a cooking grate for use on a grill is provided having a plurality of spaced apart rungs, each rung having a top surface and a bottom surface, the bottom surface forming a downwardly facing, substantially hollow channel; and at least one cross member, the cross member having a top surface and a bottom surface, the bottom surface forming a downwardly facing, substantially hollow channel; wherein the hollow channels of the rungs are in fluid communication with the hollow channel of the cross member.

Accordingly, it is an object of the present invention to provide a cooking grate that promotes better thermal management and heat transfer.

It is another object of the present invention to provide a cooking grate that includes substantially hollow or downwardly facing channel shaped rungs that are in fluid communication with each other.

It is an additional object of the present invention to provide a cooking grate having a plurality of substantially hollow or downwardly facing channel shaped rungs that are in fluid communication with each other and a substantially hollow, downwardly facing cross member.

It is also an object of the present invention to provide a cooking grate having a border forming a downwardly facing concave channel to which the rungs are joined and are in fluid communication therewith.

It is a further object of the present invention to provide a cooking grate having a substantially hollow border which may be in fluid communication with the previously mentioned hollow rungs and/or cross member.

It is still another object of the present invention to provide a cooking grate having substantially hollow or channel shaped rungs which are in fluid (air) communication with the substantially hollow border or a border having a substantially downwardly facing channel.

It is still a further object of the present invention to provide a cooking grate having substantially hollow or channel shaped rungs with spaces therebetween wherein the rungs are positioned to coincide with and/or be positioned above the heat source.

It is still an additional object of the present invention to provide a cooking grate having substantially hollow or channel shaped rungs having a tapered bottom surface that slopes downward toward the center of the firebox.

Still yet another object of the present invention is to provide a cooking grate having feet attached to the underside of the substantially hollow border.

Inventor's Definition of the Terms

The following terms which may be used in the various claims and/or specification of this patent are intended to have their broadest meaning consistent with the requirements of law:

"Grill assembly" as used herein includes the components of a typical grill such as a firebox, legs or a stand supporting the firebox, a heat source, a cooking grate and a lid (that may be hinged to the firebox). Grill assembly may also include grills without legs or a cart, such as countertop or "drop-in" units with a firebox, heat source, cooking grate, lid and the like.

"Heat source" as used herein shall mean electric (i.e., an electric heating element), gas (i.e., natural, propane or other gas delivered via burner tubes) and/or charcoal (i.e., charcoal, coal, wood or other combustive materials).

"Firebox" as used herein shall mean the lower enclosure of a grill that houses and/or supports the heat source and the cooking grate. One of skill in the art may also refer to the firebox as a cookbox.

"Cooking chamber" as used herein refers to the portion of the grill assembly generally above the grate in the firebox and below the lid when in a closed position on the firebox.

"Ledge" as used herein shall mean any structure capable of supporting a cooking grate in the firebox to form a cooking surface on the top of the cooking grate. Such structures may include tabs, a rim or a shelf around all or a portion of the interior of the firebox and/or clip or hook type members. Ledge as used herein may also include the firebox itself in embodiments where the cooking grate is part of or integral with the firebox.

Where alternative meanings are possible, in either the specification or claims, the broadest meaning is intended consistent with the understanding of those of ordinary skill in the art. All words used in the claims are intended to be used in the normal, customary usage of grammar, the trade and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which:

FIG. 1 is a top perspective view of a preferred embodiment of a grate of the present invention shown in conjunction with a typical firebox and representative electric heating element, as well as two grate sections forming the cooking surface.

FIG. 2 is a bottom perspective view of a preferred grate of the present invention showing the generally downward facing, hollow or channel shaped rungs, a generally hollow shaped cross member, and the rungs and cross member joined to and in fluid communication with a border having a substantially hollow, downwardly facing concave channel on its bottom surface.

FIG. 3 is a cross-sectional view of the preferred grate of the present invention taken along line 3-3 of FIG. 1 and showing a preferred border.

FIG. 3A is a cross-sectional view of a preferred grate of the present invention having an alternative three sided border forming a generally hollow interior channel or plenum.

FIG. 3B is a cross-sectional view of the alternative preferred border of FIG. 3A of the present invention.

FIG. 5 is a front plan view of the inside edge of a preferred alternative embodiment of a grate section of the present invention showing tapered rungs that have their largest height in the center of the rungs.

FIG. 6 is a cross-sectional view of the preferred alternative embodiment of the grate rungs of the present invention taking along line 6-6 of FIG. 4 showing the tapered rungs.

FIG. 6A is a cross-sectional view of the alternative rungs of FIG. 4 and the alternative border of FIGS. 3A and 3B of the present invention.

DETAILED DESCRIPTION OF PREFERRED EMBODIMENTS

Figure 2A:
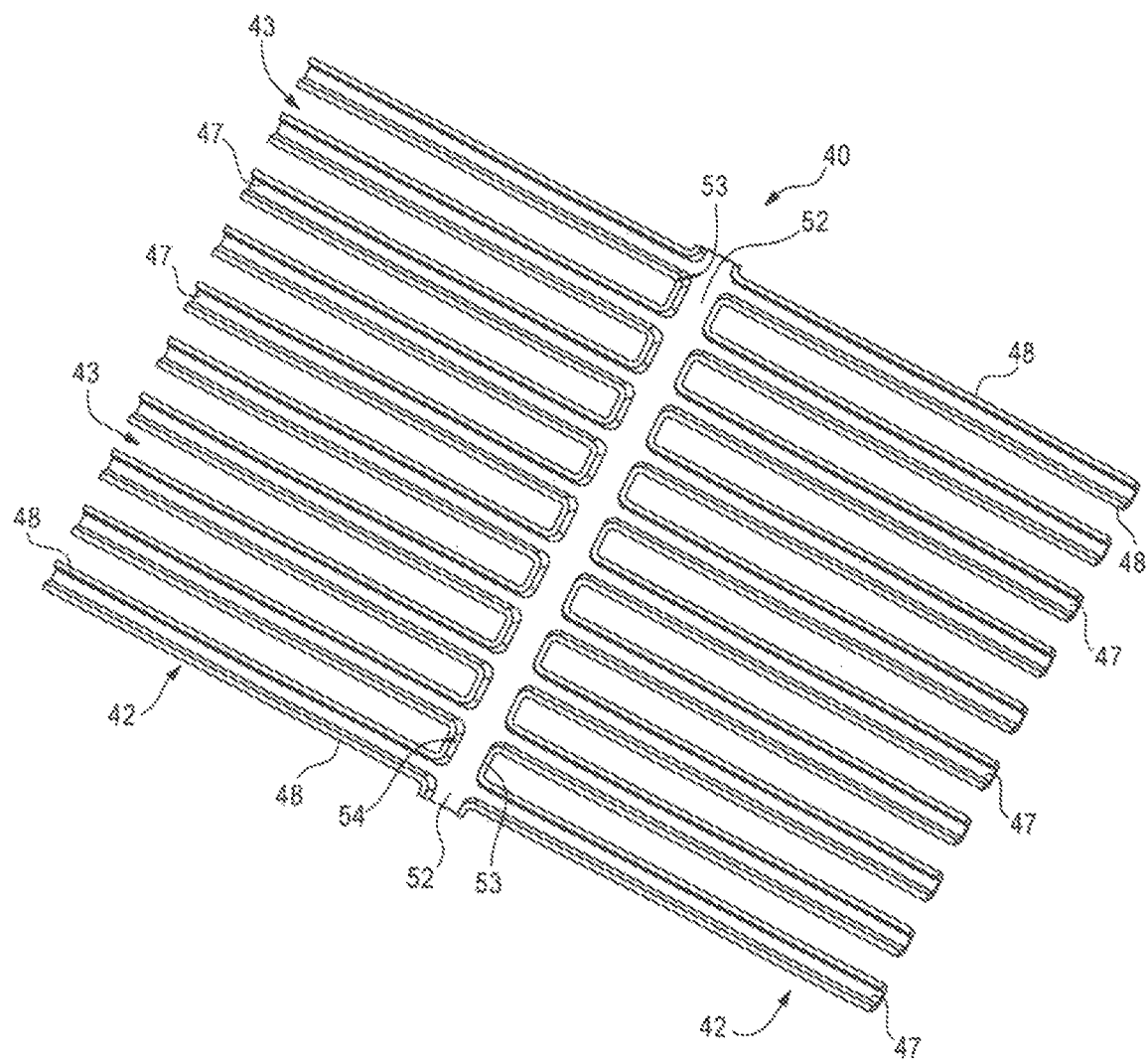
FIG. 2A is a bottom plan view of a preferred alternative embodiment of the grate of the present invention showing the hollow channels on the bottom surface of the rungs in fluid communication with the hollow channels on the bottom surface of a cross member, all in fluid communication with each other.

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

A preferred cooking grate of the present invention is shown generally as 40 in FIG. 1. Cooking grate 40 may be used on a variety of grill assemblies having a variety of shapes and heat sources. A generally rectangular firebox is shown as 10 in FIG. 1. It will be understood by those of skill in the art that firebox 10 may be other shapes, such as generally square or circular. In addition, in a preferred embodiment of the present invention, two cooking grates 40, which also may be referred to herein as cooking grate sections 40, are provided, one for the left side of the firebox and one for the right side of the firebox 10. As a result, the terms cooking grate and cooking grate sections are used interchangeably in this patent. In the preferred embodiment of FIG. 1, cooking grates 40 (i.e., the two cooking grate sections 40) are a mirror image of each other. It will be understood by those of skill in the art that a cooking surface 41 formed by the cooking grates 40 of the present invention may be formed of a single grate section 40 or grate 40 or more than two grate sections 40. In addition, a representative electric heating element 12 is shown as the heat source in a preferred embodiment. Those of skill in the art will further understand that the cooking grates of the present invention may be used with grill assemblies having other heat sources.

Representative firebox 10 includes a first (or front) wall 17, a second (or rear) wall 16, a third (or right) side wall 14 and a fourth (or left) side wall 15. Bottom wall 18 includes an opening 19 where grease or other cooking debris may be discharged from the firebox 10 and collected in a drip pan (not shown) for purposes of cleaning or removal. A ledge 20, as broadly defined herein, is positioned along the interior upper portion of firebox 10 and supports grate or grate sections 40 in a generally horizontal position below rim 21 of firebox 10. It will be understood by those of skill in the art that a datum or other locating member may be provided (not shown) on ledge 20 or elsewhere on the firebox 10 to provide a locating feature for placement of grate sections 40 (particularly in embodiments where two or more grate sections 40 are used) so that the user may properly install the grates 40. Alternatively, the right and left grate sections 40 may not be symmetrical, such that they may be placed on ledge 20 only on the proper side. As previously indicated, when grate 40 is referenced herein, it will be understood that a cooking surface 41 may include a single grate 40 or two or more grate sections 40.

A preferred embodiment of grate 40 may be seen by reference to FIGS. 1, 2 and 3. Grate 40 includes a plurality of spaced apart and substantially hollow or open rungs 42. Between each rung is a gap or open space 43. In a preferred embodiment, the rungs 42 are parallel to one another. It will be understood that other rung 42 configurations are contemplated, such as diamond shaped or criss-crossed rungs 42 (not shown). Each rung 42 has a length (FIGS. 1 and 2) and a cross-sectional shape (FIG. 3). In a preferred embodiment, the length of the rungs 42 extends from first or front 17 to second or back 16 of firebox 10. Although preferred, it will be understood that the rungs 42 of grate 40 of the present inventions (when parallel) may have a length from a second side 14 to a third side 15 of firebox 10. Accordingly, in this patent, front, back, right and left are used for illustrative purposes only. In the preferred embodiment, the front or first end 44 and back or second end 45 of each rung 42 is attached to (or otherwise joined with) and is in fluid communication with a substantially hollow border 60 as hereinafter described. Each rung 42 includes a top surface 46 and a bottom surface 47. The top surface 46 of the plurality of rungs 42 collectively form the cooking surface 41 upon which food items are placed.

A preferred cross-sectional shape of rungs 42 in a preferred embodiment can be seen in FIG. 3. The underside of a preferred half grate section 40 and preferred rungs 42 may best be seen by reference to FIG. 2. As shown in FIGS. 1 and 3, the top surface 46 is flattened to support the food to be cooked. It will be understood by those of skill in the art that top surface 46 may take other shapes consistent with the present inventions. In a preferred embodiment, bottom surface 47 forms a substantially hollow, downwardly oriented concave channel. It will be understood by those of skill in the art that other substantially open or channel-like shapes of bottom surface 47 may be used consistent with the present inventions. Alternatively, a rung 42 formed from a hollow tube having a substantially hollow interior may also be used. Each rung 42 includes side surfaces 49 which terminate in two bottom edges 48. In this manner, a preferred substantially hollow channel is formed on the bottom surface 47 of rungs 42 to trap hot air rising from the heat source and to provide increased surface area to absorb radiant heat energy. In addition, hot air is allowed to flow along the substantially hollow channel formed on lower surface 47 to other parts of rung 42, cross member 50 and/or border 60 as hereinafter described.

Figure 2B:
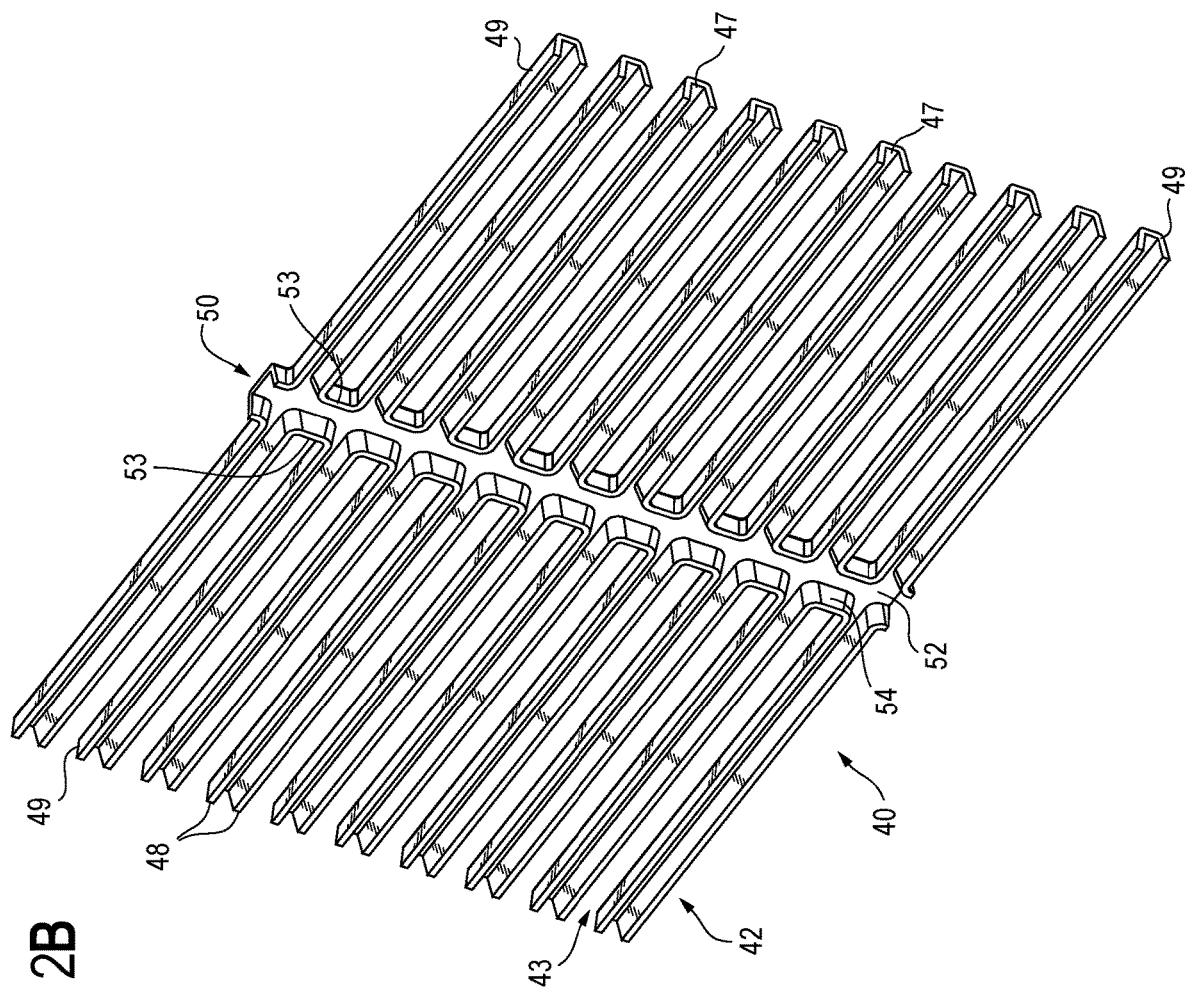
FIG. 2B is a bottom perspective view of the preferred alternative embodiment of the grate of FIG. 2A.
Figure 4:
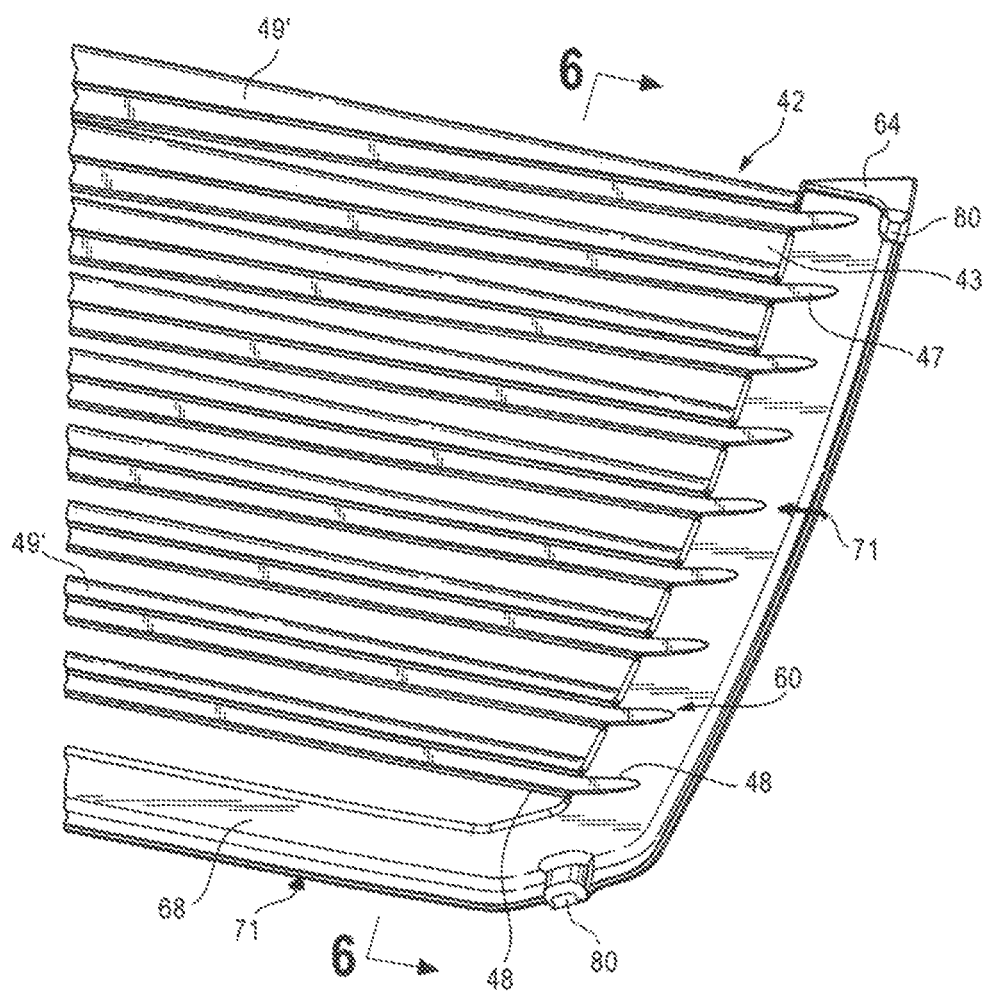
FIG. 4 is a bottom perspective view of a portion of an alternative embodiment of a grate section of the present invention, the embodiment having rungs that are tapered on their bottom surface and joined to the border embodiment of FIG. 3.

A transverse cross support member 50 may also be provided to help strengthen grate 40 and to support rungs 42. Cross member 50 may also aid in fluid communication between the rungs 42 and/or border 60. In a preferred embodiment, a single cross member 50 is provided and has the same general cross-sectional shape as rungs 42. Specifically, cross member 50 has a top surface 51, bottom surface 52, side surfaces 54 and bottom edges 53. As shown in FIG. 2, a substantially hollow channel is formed on the bottom surface 52 to function to trap and/or transfer hot air and provide increased surface area like the bottom surface 47 of rungs 42 as discussed above. As shown in FIG. 2, the side surfaces 54 of cross member 50 interrupt the channel formed in the concave bottom surface 47 of rungs 42. In other contemplated embodiments (see e.g., FIGS. 2A and 2B), cross member 50 may be configured so that the channel on bottom surface 47 of rung 42 runs the entire length of rung 42. In addition, top surface 51 may form part of the cooking surface 41 or it may be positioned below the top surface 46 or rung 42 so as not to be part of cooking surface 41 as shown. In the preferred embodiment, cross member 50 is approximately at the center 39 of the length of rungs 42. In embodiments that have more than one cross member 50, such members may not be located at the center 39 of rungs 42.

FIGS. 2A and 2B show alternative embodiments of the rungs 42 and cross member 50 of the present invention. In this embodiment, the side surfaces 54 of cross member 50 do not interrupt the channel on the bottom surface 47 of rungs 42. In other words, the substantially open, downwardly facing channel formed on the bottom surface 47 of rungs 42 is in fluid communication with the substantially hollow channel formed on bottom surface 52 of cross member 50. In this manner, the rungs 42 and cross member 50 are in fluid communication with each other. This alternative configuration may be used with a border 60 (or border portion) as hereinafter described, but is particularly useful in embodiments of grate 40 of the present invention that do not include a border 60.

A substantially hollow border 60 is also provided, into which the ends 44 and 45 of rung 42 are joined. As indicated, in a preferred embodiment, two grate sections 40 are used to form cooking surface 41. In this embodiment, border 60 includes a front (or first) border portion 61 adjacent to front wall 17, a rear (or second) border portion 62 adjacent to rear wall 16 and a side (or third) border portion 63 adjacent to either side wall 14 or side wall 15 of firebox 10. In such an embodiment, one end of cross member 50 is joined to, and preferably in fluid communication with, side (or third) border portion 63. In this embodiment, there is only one side border portion 63 on each cooking grate piece 40, since the two center edges of right and left grate 40 without a side border portion 63 come together in the center of firebox 10 (see generally, FIG. 1).

It will be understood by those of skill in the art that the present inventions contemplate different border 60 arrangements. For example, in the embodiment of FIG. 1, it is possible to have only a front (or first) border portion 61 and a rear (or second) border portion 62. In an embodiment where only one cooking grate 40 is used, a border 60 around the entire perimeter of grate 40 and ledge 20 may be provided. Also as used herein with respect to grate 40 and border portions 61, 62 and 63, the first 61 and second 62 border portions are opposite each other. The third 63 and any additional border portions are adjacent to and/or interconnect the first 61 and second 62 border portions. In other words, first and second border portions 61, 62 do not have to coincide with the front and rear of the firebox 10 or grate 40. This is because, among other reasons, the grate 40 may take a variety of configurations (e.g., non-parallel rungs 42 or rungs 42 going from side to side of firebox 10), as well as different border 60 configurations (e.g., two, three or four border portions).

As shown in a preferred embodiment of FIG. 1, when the two grate portions 40 are used, front (first) 61, rear (second) 62 and side (third) 63 border portions 60 are preferred and form the edges of grate portions 40 which are in turn supported by ledge 20 of firebox 10. And, as indicated above, embodiments of grate 40 are contemplated where there is no substantially hollow border 60. In such an embodiment, rungs 42 may be supported by ledge 20 of firebox 10. A ring or similar solid structure may also be used in the embodiment without a substantially hollow border 60. Still other embodiments are also contemplated as will be understood by those of skill in the art.

Returning to a preferred embodiment of border 60 as shown in FIGS. 1, 2 and 3, the border 60 coincides with the perimeter of ledge 20 of firebox 10 when both grate pieces 40 are installed. In a preferred embodiment, front or first border portion 61, side or third border portion 63 and rear or second border portion 62 have a substantially hollow interior as hereinafter described. As previously indicated, front, side and rear border portions do not have to coincide with the front, side and rear of the firebox 10 and the inventions are not so limited. The preferred embodiment front border portion 61 is connected at one end to side border portion 63 and rear border portion 62 is also connected at one end to side border portion 63, preferably forming a generally continuous and hollow border 60. End caps 64 are provided to close off front border portion 61 and rear border portion 62 in the center of the firebox 10 in embodiments where two grate pieces 40 are used as shown in FIG. 1.

The preferred cross-sectional configuration of border 60 (and/or border portions 61, 62 and 63) may best be seen by reference to FIGS. 2 and 3. Border 60 (i.e., if provided, the border portions 61, 62 and 63) include an upper surface 65 that slopes downwardly from an outside edge 66 of border 60 toward the center of firebox 10. In this manner, grease management is improved in that any grease that is deposited on upper surface 65 during cooking may flow down the angular upper surface 65 into the firebox. A generally vertical outer leg 67 is provided and extends downwardly from outer edge 66. Upper surface 65 and outer leg 67 form a downwardly facing, substantially hollow or open channel or chamber 70. Channel 70 permits the flow and transfer of heat between and around border 60 (if provided), hollow rungs 42 and hollow cross member 50 (if provided).

Rungs 42 join border 60 as shown in FIG. 2. Specifically, the hollow channel formed on the bottom surface 47 of each rung end 44 and 45 leads to the interior of hollow channel or chamber 70 of border 60. The top surface of each rung 42 is connected to angular upper surface 65 of border 60. Similarly, the end of cross member 50 adjacent to side portion 63 of border 60 is formed to join to side portion 63 and preferably, is in fluid communication therewith. In this manner, the channel or bottom surface 47 of rungs 42 and the channel in bottom surface 52 of cross member 50 are in fluid communication with hollow channel or chamber 70 of border 60. As a result, heat may be transferred between the channels 47 and 52 and hollow chamber 70, as well as around the hollow chamber 70 of the provided border portions 60.

These preferred arrangements provide for more even heat distribution at the cooking surface 41 because the hot air moves around grate 40 more quickly than just heat conduction within the bulk of the grate. In addition, the thermal mass provided by the hollow grate 40 and cross member 50 (if so equipped) provide for faster heat recovery time, such as when food is flipped during cooking, providing a better sear. In other words, hollow rungs 42, hollow cross member 50 and hollow border 60 permit faster heating.

An alternative embodiment of border 60 is shown in FIGS. 2A and 3B. In this embodiment, border 60 includes an inner leg 68 which extends toward outer leg 67. Inner leg 68 and outer leg 67 terminate in spaced apart ends 69. In this manner, a substantially hollow chamber 70 is formed in the interior of border 60 having an open bottom 71.

It will be understood by those of skill in the art and from the figures that preferred grate 40 is manufactured by casting. It will be appreciated, however, that the present inventions may be formed by other means. For example, individual rungs 42 formed of hollow tubular or channel members may be welded or otherwise attached to border 60 such that the hollow interior or channel is in fluid communication with the substantially hollow border 60.

Similarly, border 60 may be constructed from a variety of materials that are able to endure the high heat of a grill environment. In addition, border 60 does not have to take the generally angular shape of the preferred embodiment as shown, for example, in FIG. 3. For example, the cross-sectional shape of border 60 may be rectangular or triangular (FIGS. 3A and 3B) as opposed to the generally angular cross-section as shown in the preferred embodiment of FIGS. 2, 3, 4 and 6. Further, although the opened bottom 71 of border 60 is preferred because of heat transfer considerations, a closed bottom 71 may also be used consistent with the present inventions.

In the preferred embodiment, a plurality of feet 80 are attached to the bottom of border 60. Feet 80 are located near but within the edge of border 60 and are sized and positioned to rest on ledge 20 of firebox 10. The feet 80 keep border 60 from contacting ledge 20 around the entire perimeter of ledge 20 and border 60. This aids grease management and prevents grease from being trapped. Similarly, feet 80 space the open bottom 71 of border 60 from abutting ledge 20. This keeps the open bottom 71 of hollow chamber 70 open so that heat is better and more freely transferred around grate 40.

An alternative preferred embodiment of the rungs 42 of the present inventions is shown in FIGS. 4, 5, 6 and 6A. In this embodiment, the rungs 42 are tapered from the outside edges to the center of the firebox 10. More specifically, rungs 42 in the alternative preferred embodiment include a top surface 46 and a bottom surface 47 forming a substantially hollow channel. Bottom edges 48 and tapered side surfaces $49^1$ are provided. As best shown in FIG. 5, the side surfaces $49^1$ taper along the length of rung 42 from the end that joins with generally hollow border 60 and the approximate center 39 of tapered rung 42. In all other aspects, the description of this alternative embodiment is the same as the earlier description of the preferred embodiment. However, the alternative embodiment having tapered rungs $42^1$ is particularly useful for grease management. For example, grease on rung $42^1$ may be directed to the center 39 by running down the bottom edges 48 of the tapered rung $42^1$ toward the center of firebox 10. Similar heat transfer and thermal management of both embodiments is achieved by, among other things, the above described substantially hollow border 60 and substantially hollow bottom 47 of rungs 42 and $42^1$. It will be understood by those of skill in the art that other configurations are possible and are contemplated by this patent.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:
1. A grill assembly comprising:
a firebox having a top, a bottom, a front and a back, the bottom of the firebox having a generally central opening;
a heat source located near the bottom of the firebox;
a plurality of cooking grates removably supported by the firebox, above and adjacent to the heat source to form a cooking surface of the grill, the cooking grate defined by at least a first border portion, a second border portion and an additional border portion interconnecting the first and second border portions and supported by the firebox, each border portion including an upper surface connected to an outer leg wherein the upper surface and outer leg form a substantially open, downwardly facing channel and wherein each border portion has a substantially hollow, downwardly facing interior channel;
a plurality of substantially hollow, spaced apart rungs, wherein each rung has a length, two ends, a bottom surface and a cross-sectional shape, the bottom surface of the cross-sectional shape forming a substantially hollow channel along the bottom surface of at least a substantial portion of the length of each rung, each end of the substantially hollow rungs is joined to and in fluid communication with the substantially hollow interior of the first and second border portions; and,
at least one transverse cross member having a bottom surface with a substantially hollow, downwardly facing interior channel which is in fluid communication with said rungs.

2. The grill assembly of claim 1 wherein said cross member is in fluid communication with said additional border portion.

3. The grill assembly of claim 1 wherein the border portions include an inner leg and/or an outer leg.

4. The grill assembly of claim 1 wherein the bottom surface of the rungs include bottom edges that taper along the length from a one end and the other end toward a center of the length of the rungs.

5. A grill assembly comprising:
a firebox having a front, a back, two sides and a bottom, the bottom of the firebox having a generally central opening and an upper portion of the firebox having a ledge;
a heat source located with the firebox below the ledge;
a cooking grate removably supported on the ledge of the firebox, the cooking grate including a plurality of spaced apart rungs with spaces therebetween, the rungs having a length, a front end and a rear end, a bottom surface and a cross-sectional shape, the cross-sectional shape of the bottom surface forming a substantially open or downwardly facing, concave channel along at least a portion of the length of the rungs, and wherein the length of each rung includes two side surfaces, the side surfaces increasing in depth from each end of the rung to the center of the rung, the front end of the rungs are joined to and in fluid communication with a substantially hollow front border portion and the rear end of the rungs are joined to and in fluid communication with a rear border portion.

6. The grill assembly of claim 5 having at least one substantially hollow side border portion which is connected to and in fluid communication with the front and rear border portions.

7. The grill assembly of claim 6 wherein the border portions include an upper surface that forms a downwardly sloping surface from an outside edge of the border portion toward a center of the firebox.

8. The grill assembly of claim 5 wherein each border portion has a generally triangular cross-sectional shape and a substantially open, downwardly facing channel or hollow interior chamber.

9. A cooking grate for use on a grill, the cooking grate having a first end and a second end, the cooking grate comprising:
a substantially hollow border having at least a first border portion, a second border portion and a third border portion connected to and in fluid communication with the first and second border portions;
a plurality of spaced apart rungs having spaces therebetween, each rung having a first end, a second end, a top surface, and a bottom surface, the bottom surface forming a downwardly facing, concave shape forming a substantially hollow channel on a substantial portion of the rungs from the first end to the second end; and further, wherein the first and second end of each rung is joined to the first and second border portions respectively, such that the substantially hollow channel of the rungs is in fluid communication with the substantially hollow border portion.

10. The cooking grate of claim 9 wherein each border portion includes an upper surface and outside edge, wherein the upper surface slopes downwardly from the outside edge to an inner portion.

11. The cooking grate of claim 9 wherein the rungs include side surfaces, the side surfaces increasing in width from the first end and the second end toward a center of the rungs.

12. The cooking grate of claim 9 wherein a first, a second, and a third border portions are provided forming an edge along three sides of said grate, each of which is attached to and in fluid communication with the adjacent border portion.

13. The cooking grate of claim 10 wherein each border portion includes a downwardly facing opening or channel.

14. The cooking grate of claim 9 wherein at least one cross member, having two ends and a bottom surface forming a substantially hollow, downwardly facing channel, at least one end of the cross member joined to and in fluid communication with said third border portion.

15. The cooking grate of claim 14 wherein the at least one cross member is in fluid communication with said rungs.

16. A cooking grate for use on a grill, the cooking grate comprising:
a plurality of spaced apart rungs, each rung having a top surface and a bottom surface, the bottom surface forming a downwardly facing, substantially hollow channel; and
at least one cross member, the cross member having a top surface and a bottom surface, the bottom surface forming a downwardly facing, substantially hollow channel wherein the hollow channel of the rungs is in fluid communication with the hollow channel of the cross member;
at least a front border portion, a rear border portion and a side border portion, each border portion forming a substantially enclosed, downwardly facing channel, each border portion having an upper portion that forms a downwardly sloping surface from an outside edge of the border portion toward the center of the firebox; and,
wherein the rungs are in fluid communication with the front and rear border portions and the cross member is in fluid communication with the side border portion and the front, side and rear border portions are in fluid communication with each other.

17. The cooking grate of claim 16 wherein the bottom surface of the rungs includes bottom edges that taper along the length from one end and the other end and increasing in depth toward a center of the length of the rungs.

18. The cooking grate of claim 16, wherein a plurality of grates are provided to form a cooking surface on the grill.

* * * * *